April 14, 1925.
A. G. RONNING ET AL
ENSILAGE CUTTER
Filed March 13, 1924　　3 Sheets-Sheet 1
1,533,902
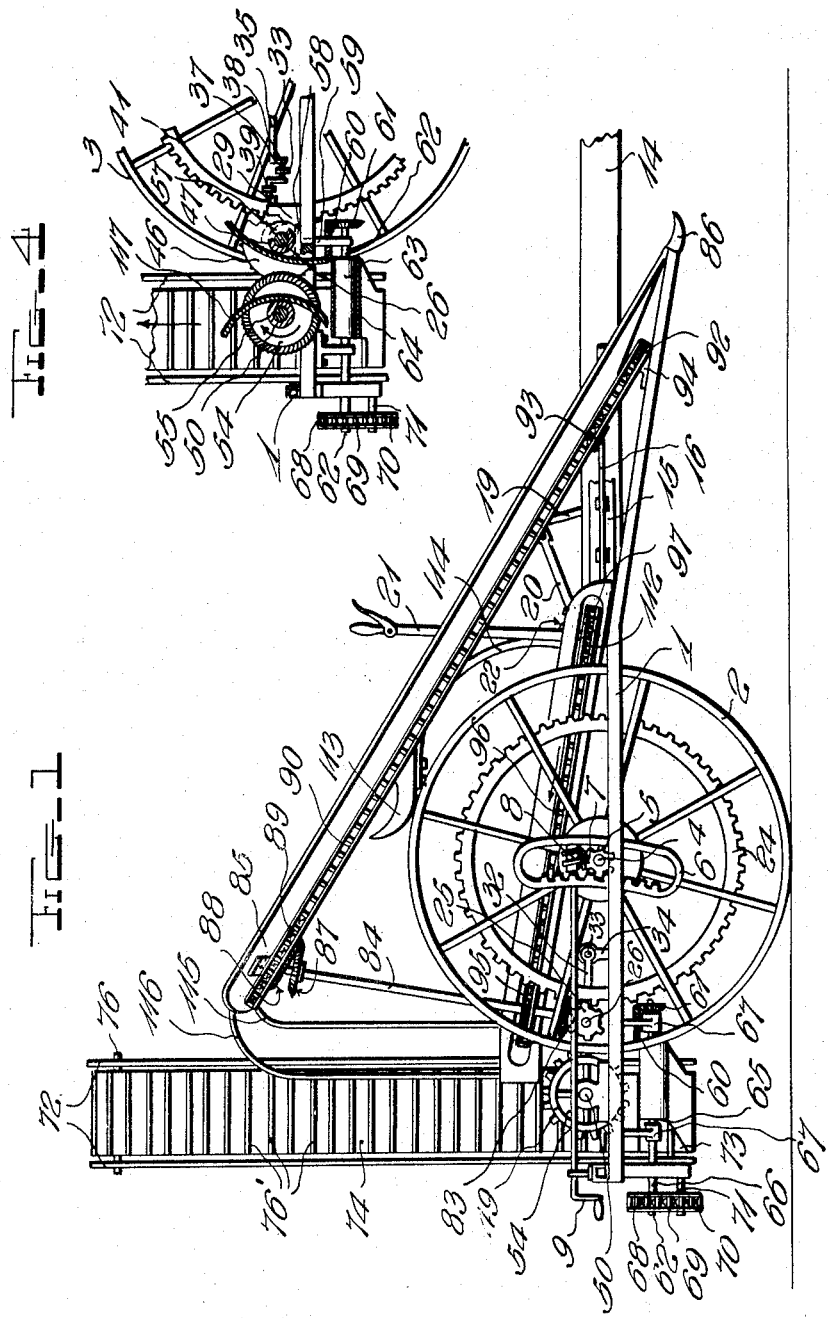
Inventors
Andrean G. Ronning
Adolph Ronning
By
their Attorney

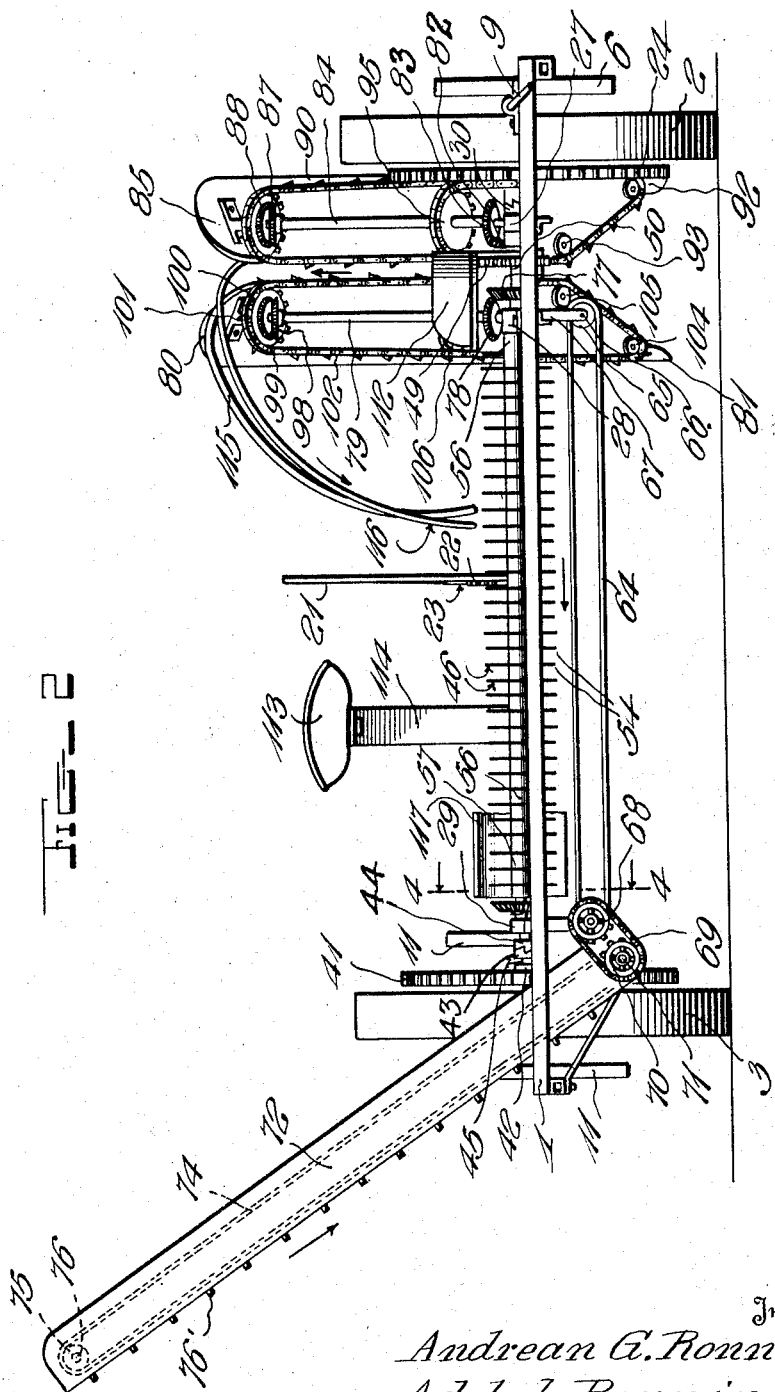

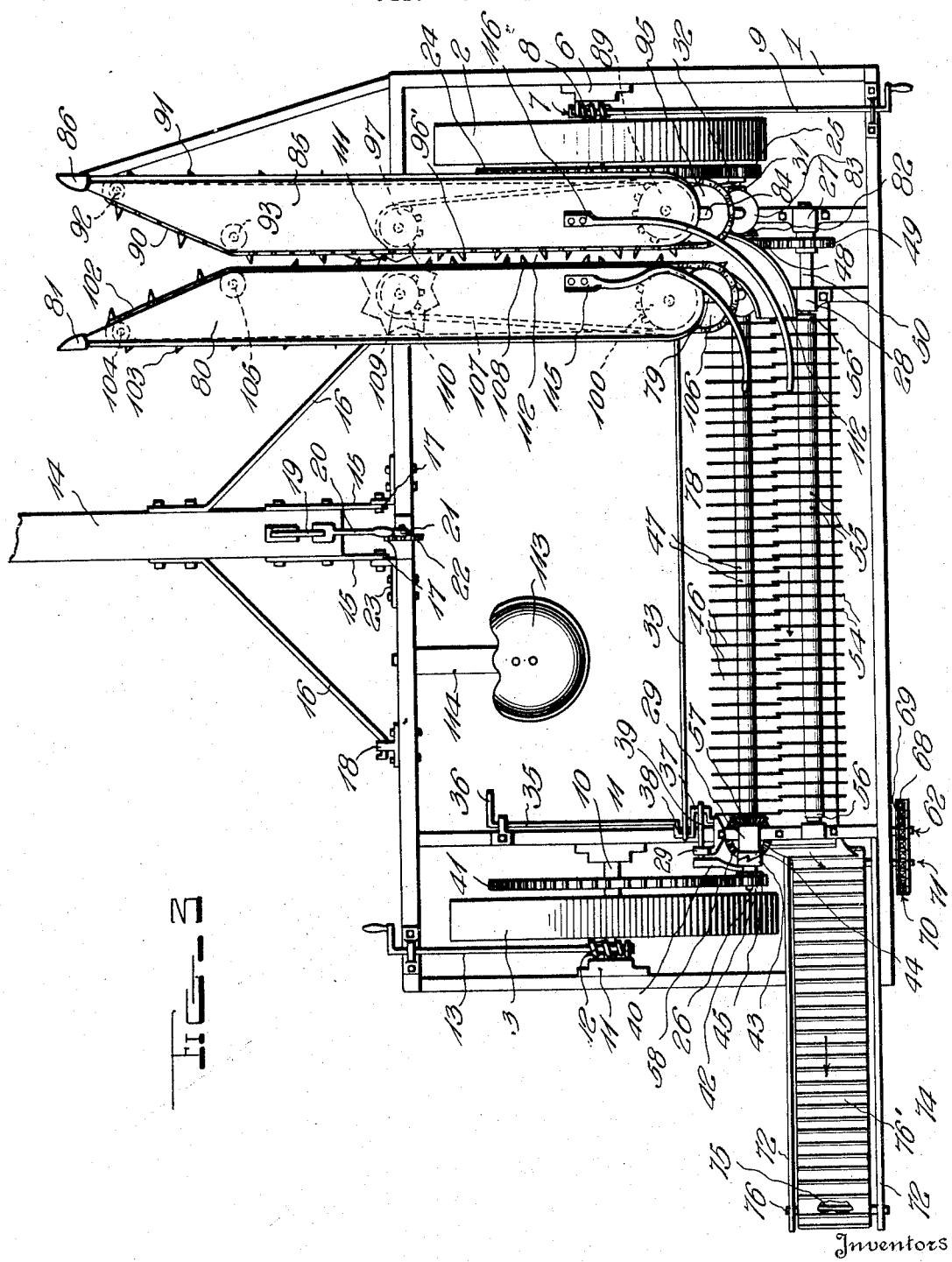

Patented Apr. 14, 1925.

1,533,902

UNITED STATES PATENT OFFICE.

ANDREAN G. RONNING AND ADOLPH RONNING, OF MINNEAPOLIS, MINNESOTA.

ENSILAGE CUTTER.

Application filed March 13, 1924. Serial No. 699,125.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ensilage Cutters, of which the following is a specification.

Our invention has for its object to provide a simple and efficient ensilage harvester, that will cut the corn stalks and the like off the field, chop said stalks into small particles, and elevate and deliver said particles into the box of a wagon which may be drawn alongside of the machine.

The machine consists in general, of a primary cutting mechanism for cutting the standing stalks off the field, a second cutting mechanism receiving therefrom which consists of co-operating circular cutter blades which are laterally arranged and regularly spaced apart and which are mounted on two parallel shafts which run transversely to the movement of the machine, elevators receiving therefrom together with other parts and combination of parts hereinafter more fully described, illustrated in the accompanying drawings and specifically set forth in the claims.

In the accompanying drawings which illustrate the invention. like characters indicate like parts throughout the several views.

Referring to the drawings:

Fig. 1 is a side elevation of the machine, with some parts broken away.

Fig. 2 is a rear elevation of the machine.

Fig. 3 is a plan view of the machine with some parts broken away.

Fig. 4 is a detail in vertical section taken approximately on the line 4—4 in Fig. 2, some parts being broken away.

The main frame 1 of the machine is carried by and nearly balanced on the rear wheels 2 and 3 and is connected to the said wheels by means providing for vertical adjustment of the said main frame. Wheel 2 is journaled loosely on the short axle 4. This axle 4, at its ends, has small spur gears 5 which work vertically in guide brackets 6 secured to the main frame 1, and provided with rack teeth with which the said gears are engaged. Shaft 4 carries at one end a worm gear 7 which is engaged by a profile worm 8 which is carried by the front end of the shaft 9 which is journaled near its ends in suitable bearings which are secured by bolts or otherwise to main frame 1, and which carries at its rear end, a crank of well known and approved construction. The wheel 3 is loosely journaled on a short axle 10, which carries at its ends spur gears which work vertically in guide brackets 11 which are secured to the main frame 1 and which are provided with rack teeth with which the said gears are engaged in any well known and approved manner. Said last named spur gears and guide brackets 11 are similar in construction to that of spur gears 5 and guide brackets 6. Shaft 10 carries at one end a worm gear of well known and approved construction which meshes with a profile worm 12 which is secured to the rear end of shaft 13 which carries at its front end a crank arm which is loosely journaled near its ends in suitable bearings which are secured by means of bolts or otherwise to the main frame 1. Means have now been described whereby the main frame may be bodily adjusted vertically.

A tongue or pole 14 is connected to the front of the main frame with freedom for vertical pivotal adjustment, and as shown, this is accomplished by providing the said pole with rearwardly projecting metallic straps 15 and brace rods 16, the rear ends of which are pivotally connected to the said main frame 1, respectively, at 17 and 18. Link 19 connects the intermediate portion of the pole 14, to the forwardly projecting arm 20 of a latch lever 21 which is pivoted to a latch segment 22 which is rigidly secured to the main frame 1. Latch lever 21 is provided with the usual latch piece 23 which is engageable with the notches of the latch segment 22, to secure the lever in any set adjustment. By oscillatory movements of the lever 21 the front portion of the main frame 1 and the rear portion of the pole 14 may be raised and lowered with a sort of toggle action.

Wheel 2 is provided with a large spur gear 24 which meshes with a relatively small spur gear 25 which is loosely journaled on one end of a shaft 26 which runs parallel to shafts 4 and 10 and which is loosely journaled, near its ends, in suitable bearings 29 which are secured by bolts or otherwise to the main frame. Spur gear 25 carries on one side a clutch hub of well known construction which meshes with a clutch hub 30 of well known construction, which is rigidly secured to shaft 26. The clutch hub which is secured to the spur gear 25 has a groove 31 cut around it, and therein engaged by a bifurcated spring lever 32 which is secured to the end of rod 33 which is loosely journaled at one end in a suitable bearing 34 with freedom to slide back and forth. Bearing 34 near the bifurcated spring 32 is secured to the main frame 1 by bolts or otherwise. The other end of the rod 33 is pivotally attached to one of the cranks 38 of the crank shaft 35 which is loosely journaled near its ends, in suitable bearings which are secured to the main frame 1. Crank shaft 35 carries at its front end a crank 36 of common and well known construction. Rod 39 is suitably journaled at one end in casting 29 with freedom to slide back and forth. Rod 39 is pivotally attached at one end to crank 37 of the crank 35. Rod 39 carries at its other end a bifurcated spring lever 40. Wheel 3 carries on its inner side a large spur gear 41, which meshes with a relatively small spur gear 42, which is loosely journaled on one end of the said shaft 26, with freedom to slide forth and back. Spur gear 42 carries on its inner side a clutch hub 42 which meshes with clutch hub 44 which is rigidly secured to shaft 26. A groove 45 is cut around clutch hub 43 and is therein engaged by the said bifurcated spring lever 40. Thus by turning crank shaft 35, by means of its crank 36, cranks 37 and 38 will cause their attached rods 39 and 33 respectively to slide forth and back in opposite directions so as to cause clutch hubs 25 and 43 with their attached spur gears 25 and 42 to slide forth and back in opposite directions, thereby affording a convenient means for putting the machine in and out of gear.

Shaft 26 carries a plurality of circular cutting blades 46 which are regularly spaced apart by thimbles 47. Shaft 26 carries a spur gear 48 which meshes with a spur gear 49 which is secured to a shaft 50 which runs parallel to shaft 26 and which is journaled in suitable bearings 51, 52 and 53 which are secured by bolts or otherwise to the main frame 1. Shaft 50 carries a plurality of circular cutting blades 54 which rotate with the shaft 50 which runs through them. In like manner circular cutting blades 46 are provided to rotate with the shaft 26 which runs through them. Circular cutting blades 54 are regularly spaced apart by sleeves or thimbles 55 which are preferably similar in length and construction to thimbles 47. Nuts 56 are preferably threaded to the shaft 50 so as to form a convenient means for tightening the said circular cutting blades 54 so as to hold them parallel to each other and rigidly secured to shaft 50. In like manner shaft 26 is provided at one end, near casting 28, with threads and with a threaded nut (not shown). Shaft 26 carries a beveled gear 57 between casting 29 and the circular cutting blades 46. Said beveled gear 57 is preferably threaded so as to work in threaded cut around shaft 26 so as to afford a means for tightening the circular cutter blades 46. Beveled gear 57 meshes with a beveled gear 58 which is secured to the upper end of a shaft 59 which is suitably journaled in casting 29 and which carries at its lower end a beveled gear 60 which meshes with a beveled gear 61 which is secured to the inner end of a shaft 62, which is journaled near its ends in suitable bearings, which are secured to the main frame. Shaft 62 carries a roller 63 over which runs an endless conveyor belt 64, which runs transversely to the movement of the machine over a second roller 65, carried by a shaft 66 journaled at its ends in bearings 67 which are secured to the main frame 1 in any suitable manner. Shaft 62 carries, at its rear end, a sprocket 68 over which runs a sprocket chain 69 which runs in its downward and outward loop over a sprocket 70 which is secured to the rear end of a shaft 71 which runs parallel to a shaft 62 and which is loosely journaled near its ends in suitable bearings which are secured by bolts or otherwise to the lower and inner ends of elevator frame side boards 72 which incline upward and outward as illustrated, and which are secured near their lower and inner ends to the main frame 1 in any convenient manner. Shaft 71 carries a roller 73 over which runs an endless conveyor belt 74 which operates simultaneously with the conveyor belt 64 and is arranged to receive therefrom. Endless conveyor belt 74 runs in its upper and outward loop over a roller 75 which is carried by a shaft 76 which is loosely journaled, at its ends, in suitable bearings which are secured to the upper and outward ends of the said elevator frame side boards 72. The said bearings of shaft 76 may as well be provided with the usual adjustable mechanisms which are ordinarily employed in similar elevators but which are not shown in the accompanying drawings. Endless conveyor belt 74 is preferably made of canvas and provided with the usual slats 76 to better facilitate the carrying of the cut particles of ensilage from the endless conveyor belt 64 into the box of a wagon which is drawn alongside of the machine, when said machine is in operation.

Shaft 26 carries near one end a beveled gear 77 which meshes with a beveled gear 78 which is secured to the lower end of a counter shaft 79 journaled near its lower end in a suitable bearing which is secured to the main frame. Shaft 79 is loosely journaled at its upper end in a suitable bearing which is secured by bolts or otherwise to the rear and upper end of the forwardly and downwardly inclined gathering board 80 which is secured at its front and lower end to a shoe 81 which is secured to the front end of a forwardly projecting portion of the main frame in any well known and approved manner. Shaft 26 carries a beveled gear 82 which meshes with a beveled gear 83 which is secured to the lower end of a counter shaft 84 loosely journaled near its lower end in suitable bearings secured to the main frame. Shaft 84 is loosely journaled at its upper end in suitable bearings secured to the rear and upper end of a forwardly and downwardly inclined board 85 which is secured at its front and lower end to a shoe 86 which is secured to the front end of a forwardly projecting portion of the main frame. Shaft 84 near its upper end carries a miter gear 87 which meshes with bevel gear 88 secured to the underside of a sprocket 89 loosely journaled on a suitably constructed portion of said bearing 85 in any manner ordinarily employed in similar gearing mechanisms. Endless gathering chain 90 carries fingers 91 of well known construction. This chain runs over sprockets 89 and over sprocket 92 and over idler 93 which is loosely journaled in a suitable bearing which is secured by bolts or otherwise to the gathering board 85 in any well known and approved manner. Sprocket 92 is loosely journaled on a bearing support 94 which is secured near the front end to the said forwardly projecting portion of the main frame 1 in any suitable manner. Shaft 84 carries a sprocket 95 over which runs an endless gathering chain 96 which carries gathering fingers of well known and approved construction and which runs in its forward and downward loop over a sprocket 97 which is journaled to the main frame in any suitable manner. Shaft 79 carries a bevel gear 78 which meshes with a bevel gear 99 secured to the under side of the sprocket 100 suitably journaled on bearing support 101 in a manner as is ordinarily employed in similar gearing mechanisms. Endless gathering chain 102 runs parallel to gathering board 80 and is provided with the usual gathering fingers 103. Gathering chain 102 runs over sprockets 100 and 104 and over idler 105 which is loosely journaled on suitable bearing secured to the gathering board 80 (see Figs. 2 and 3). Sprocket 104 is loosely journaled on a suitable bearing which is secured by bolts or otherwise near the front end of the forwardly projecting portion of the main frame. Shaft 79 carries a sprocket 106 over which runs an endless gathering chain 107 which runs parallel to gathering chain 96 and which is provided with gathering fingers 108 of well known and approved construction. Gathering chain 107 runs in its forward and downward loop over a sprocket 109 which is loosely journaled on a suitable bearing which is secured to the main frame 1 with freedom for adjustment. Sprocket 109 carries on its under side a circular cut out cutter blade which rotates with said sprocket 109 and which shears in co-operation with a cutter plate 111 which is secured by bolts or otherwise to the main frame 1 (see Fig. 3).

A chute 112 runs parallel to the gathering chains 96 and 107 and is secured by means of bolts or otherwise to the main frame 1. The front end of the chute 112 is arranged to receive from the circular cut out cutter blade 110 and from the cutter blade 111, and the rear end of the chute 112 is gently curved to one side so as to deliver between shafts 26 and 50 and immediately above the nearest circular cutter blades 46 and 54 as best illustrated in Fig. 2 and Fig. 3.

The cutter blades 46 and 54 may have cutouts at their circumferences of any desired size or shape. We prefer, however, to have the circumferences of the said circular cutting blades 46 and 54 serrated as illustrated in Fig. 4.

A driver's seat 113 and seat spring 114 may be secured to the front and outer portion of the main frame in any well known and approved manner. Guide springs 115 and 116 are secured to the upper and rear ends of gathering boards 80 and 85. Said guide springs are spaced apart so as to leave a channel between them and are gently curved to one side and downwardly so as to guide the top ends of the stalks between the shafts 26 and 50.

The front inner edges of the gathering boards 80 and 85 diverge so as to guide the standing stalks into the channel left between them.

As the machine is drawn forward the standing stalks are directed into the channel left between the gathering boards 80 and 85 by the gathering chains 90 and 102 which run in the direction as indicated by the arrows. The stalks are then severed from the ground by means of the cutter plate 111 and by means of the rotating circular cut out cutter blade 110. The severed stalks are then carried by gathering chains 90, 102, 96 and 107, upwardly and rearwardly in a vertical position with their butt ends riding upon the bottom of the chute 112. As the stalks are then carried to the side by the gathering chains 102 and 107 they are directed by the rear curved portion of chute 112 and by the guide springs 115 and 116 into direct engagement with the circular cutter blades 46 and 54 and are cut into small particles as the said circular cutter blades are rotated inwardly and in co-operation by their respective shafts and gearing mechanisms as already explained. The rear and inwardly turned end of chute 112 may be curved upwardly a trifle so as to retard the butts ends of the stalks at this point thereby facilitating the tipping of the stalks at this point and affording them a better chance to drop sidewise into said chopping mechanism. The cut particles then drop onto the endless conveyor 64 and are carried thereby in the direction of the arrow and delivered onto the endless conveyor 74 and carried thereby as indicated by the arrows transversely to the movement of the machine upwardly and outwardly until they are delivered by the said endless conveyor belt 74 into the box of a wagon which is drawn along side of the machine. The said chopping mechanism may as well be provided with combs of well known and approved construction and secured by bolts or otherwise to the main frame 1, and as indicated by the numeral 117 in Figs. 2 and 4.

Having now fully described and illustrated our invention what we claim to be new and desire to protect by Letters Patent is:

1. A harvesting machine having a stalk gathering and feeding mechanism, means for cutting the standing stalks from the field, a chute receiving from said cutting mechanism which is inclined upwardly and rearwardly and which is arranged to deliver to a second cutting mechanism, said stalk gathering and feeding mechanism being arranged to convey the cut stalks in an upright position from said first named cutting mechanism, means for directing the severed stalks so that they will fall from said gathering and feeding mechanism transversely of the direction of the movement of the machine, an ensilage cutting mechanism arranged to receive the stalks as they thus fall transversely of the movement of the machine and to cut the stalks into small particles as they are thus received, elevator mechanism arranged to receive from said ensilage cutting mechanism and to deliver the said cut particles of stalks from the machine, and power applying devices for operating the said several mechanisms of the said machine.

2. An ensilage harvester comprising stalk gathering and cutting mechanism, means for transferring the severed stalks rearwardly from the mechanism in an upright position, a plurality of rotatable ensilage cutting elements having parallel axes, said axes being arranged transversely of the direction of travel of the harvester and lying in a horizontal plane, means for subjecting the severed stalks simultaneously throughout their length to the cutting action of said rotatable ensilage cutting elements whereby said stalks will be cut into fine particles, a conveyor arranged beneath said ensilage cutting elements for conveying said fine particles longitudinally with respect to the axes of said rotatable ensilage cutting elements, a second conveyor arranged in proximity to the first named conveyor for receiving said fine particles whereby they will be transferred to a remote location from said rotatable ensilage cutting elements.

3. An ensilage harvester comprising stalk gathering mechanism, cutting mechanism for cutting the standing stalks from the field, means for transferring the severed stalks rearwardly from the cutting mechanism in an upright position, a plurality of rotatable ensilage cutting elements, said elements having axes arranged transversely of the direction of travel of the harvester, means for changing the direction of travel of the severed stalks from a longitudinal movement with respect to the direction of travel of the harvester to a transverse movement with respect to the direction of travel of the harvester, means for retarding the movement of the lower ends of the stalks when deflected so that the stalks will fall by gravity upon said ensilage cutting elements, whereby said stalks will be simultaneously cut throughout their length into fine particles.

4. An ensilage harvester comprising stalk gathering mechanism, cutting mechanism for cutting the standing stalks from the field, means for transferring the severed stalks rearwardly from the cutting mechanism in an upright position, a plurality of rotatable ensilage cutting elements in series arranged transversely of the direction of travel of the harvester, means for changing the direction of travel of the severed stalks from a longitudinal movement with respect to the direction of travel of the harvester to a transverse movement with respect to the direction of travel of the harvester, means for retarding the movement of the lower ends of the stalks when deflected so that the stalks will fall by gravity upon said cutting mechanism, whereby said stalks will be simultaneously cut throughout their length into fine particles, and operable means for conveying said fine cut particles to a remote location from said rotatable ensilage cutting elements.

In testimony whereof we affix our signatures.

ANDREAN G. RONNING,
ADOLPH RONNING.